United States Patent [19]

Blair, Jr. et al.

[11] 4,330,935

[45] May 25, 1982

[54] METHODS OF AND APPARATUS FOR ASSEMBLING CONTACT ELEMENTS WITH A HOUSING TO FORM A CONTACT MODULE

[75] Inventors: Thomas G. Blair, Jr.; Alfred C. Kummer, both of Omaha, Nebr.

[73] Assignee: Western Electric Company, Inc., New York, N.Y.

[21] Appl. No.: 158,083

[22] Filed: Jun. 10, 1980

[51] Int. Cl.³ ........................ H01R 43/04; B23P 19/04

[52] U.S. Cl. ........................................ 29/884; 29/759; 29/464; 29/467; 53/240; 269/903; 33/180 R

[58] Field of Search ................. 29/739, 741, 759, 760, 29/771, 790, 464, 466, 467, 882, 884, 281.1, 281.6; 33/180; 227/99, 135; 53/240, 247; 269/37, 43, 902, 903

[56] References Cited

U.S. PATENT DOCUMENTS

| | | | |
|---|---|---|---|
| 3,468,024 | 9/1969 | Yonkers | 29/466 |
| 3,641,666 | 2/1972 | Scaminaci et al. | 29/760 |
| 3,740,816 | 6/1973 | Yamaoto et al. | 29/739 |

*Primary Examiner*—Francis S. Husar
*Assistant Examiner*—Carl J. Arbes
*Attorney, Agent, or Firm*—E. W. Somers

[57] ABSTRACT

In order to facilitate the gang-insertion of a plurality of contact elements successively into a plurality of slots in each of a plurality of rows of slots in a plastic housing portion of a contact module of a connector system, an assembly fixture in the form of a block having a generally V-shaped trough formed therethrough is provided. The surfaces which form the V-shaped trough are generally normal to each other with one surface supporting portions of a surface of the plastic portion to which the slots open and the other surface supporting an edge surface of the plastic portion. A stepped surface is formed with each portion of the stepped surface adapted to support a plurality of contact elements at successively greater distances from the surface which provides edge support for the plastic portion and with overhanging portions to provide a passageway for receiving rows of priorly inserted contact elements. A plurality of the plastic portions are loaded into the trough of the fixture in end-to-end relationship with a leading one in engagement with a stop which causes a row of openings of each portion in each insertion position to be aligned with the portion of the stepped surface associated with that position and with the plurality of contact elements supported thereon.

11 Claims, 8 Drawing Figures

METHODS OF AND APPARATUS FOR ASSEMBLING CONTACT ELEMENTS WITH A HOUSING TO FORM A CONTACT MODULE

TECHNICAL FIELD

This invention relates to methods of and apparatus for assembling contact elements with a housing, and, more particularly, to methods of and apparatus for the insertion of a plurality of contact elements into each of a plurality of rows of openings in a plastic block to form a contact module.

BACKGROUND OF THE INVENTION

In the installation of telecommunications equipment, a number of situations exist which require the connection of corresponding conductors of two conductor groups such as for example between conductors of two cables. These situations differ in their requirements and thus various types of multiple conductor connectors have come into being with features designed to meet the particular requirements. For example, in telephone central offices there is a need to interconnect conductors through splicing, half tapping and bridging as well as to simply terminate conductors singly or in groups to a connector block for future use.

In several kinds of these multiple conductor connectors, a slotted beam contact element is used to establish the electrical connection between two conductors. The slotted beam contact element has double ended bifurcated beams with the furcations at each end forming a conductor-receiving slot therebetween. It is capable of penetrating conductor insulation and of making reliable electrical and mechanical connections between two conductors.

One type of multiple conductor connector is disclosed in U.S. Pat. No. 4,099,822 which issued on July 11, 1978 in the names of A. W. Carlisle and D. R. Frey. Conductors to be spliced are dressed about a two-sided mandrel which has a separate guide channel for each conductor. Each mandrel is received in a chamber of a mandrel holder which is double sided to accommodate two mandrels. The holder includes, for example, four staggered rows of slots symmetrically formed in each major face. An end of a slotted beam contact element extends through each slot to engage the corresponding conductor that is mounted around the mandrel and aligned beneath each slot. The contact elements are inserted into staggered rows of slotted openings in a plastic housing to form a connector module with the ends contained in individual protective towers extending outwardly from either side of the module. Each tower mates with one of the slots of the mandrel holder. An assembly of wired mandrels and holders comprises a receptacle for receiving two contact modules.

The successful introduction and use of this connector has necessitated the implementation of efficient assembly techniques for its component parts. For example, the assembly of the contact elements with the plastic housing to form the connector module must be accomplished at a high rate of production. However, difficulties have been encountered in devising automatic assembly apparatus for the machine assembly of these relatively small metallic parts with a plastic block. In a similar connector which is disclosed in U.S. Pat. No. 3,858,158 which issued on Dec. 31, 1974 in the names of R. W. Henn et al., a connector module included only one row of contact elements held between mating plastic parts. The assembly of such a module is far simpler than one which incudes four rows of contact elements complicated by the staggering of the rows.

What is needed and what does not appear to be provided by the prior art are methods and apparatus for the assembly of a plurality of rows of contact elements with a plastic housing. While the prior art may show the use of taped strips of contact elements which are spaced apart on the strips as required by their final placement in the plastic block, it does not appear to include an uncomplicated method of transferring these elements from their carrier strip into the staggered rows of slots.

SUMMARY OF THE INVENTION

The just-described needs for the assembly of contact elements with a housing have been met by the methods and the apparatus of this invention. A method of this invention for inserting a plurality of metallic contact elements into each of a plurality of rows of openings in a housing portion which is made of a dielectric material and in which the openings extend between two major surfaces of the housing portion includes supporting the housing portion along two surfaces that lie in intersecting planes and that are each inclined to a horizontal line. One of the planes is parallel to at least one of the major surfaces of the housing portion and the other of the planes is parallel to a peripheral edge surface of the housing portion which joins the two major surfaces. The housing portion is moved successively into and out of each of a plurality of contact element insertion positions while being maintained in engagement with said two supporting surfaces. A plurality of contact elements are supported in alignment with the housing portion in each of the insertion positions with each successive plurality of contact elements being spaced a greater distance from said other plane than the preceding plurality. The openings in successive ones of the rows in the housing portion are caused to be aligned with the plurality of contact elements in successive ones of the insertion positions and then the contact elements which are supported at each of the insertion positions are caused to be inserted into the openings of the aligned one of the rows of the housing portion.

In an apparatus of this invention, a fixture includes a generally V-shaped trough along which a plurality of the housing portions in end-to-end relationship are indexed through a plurality of contact element insertion positions. Portions of one of the major surfaces of the housing portion are supported in engagement with a surface which is parallel to the one major surface of the housing portion and a peripheral edge surface of the housing portion is supported in continuous engagement with another surface that intersects the one surface that defines the trough. Contact elements to be inserted into the openings of the housing portion at each insertion position are supported on a stepped surface with each portion thereof being spaced at incrementally greater distances from the surface of the trough which supports the peripheral edge surface of the housing portion. The fixture includes means for causing each housing portion to be indexed through the fixture so that each successive row of openings in the housing portion is aligned with the portion of the stepped contact element support surface at each successive insertion position Also, the stepped support surface is formed in a portion of the fixture which incudes a passageway extending longitudinally through the fixture to allow passage of projecting free end portions of already inserted contact elements.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
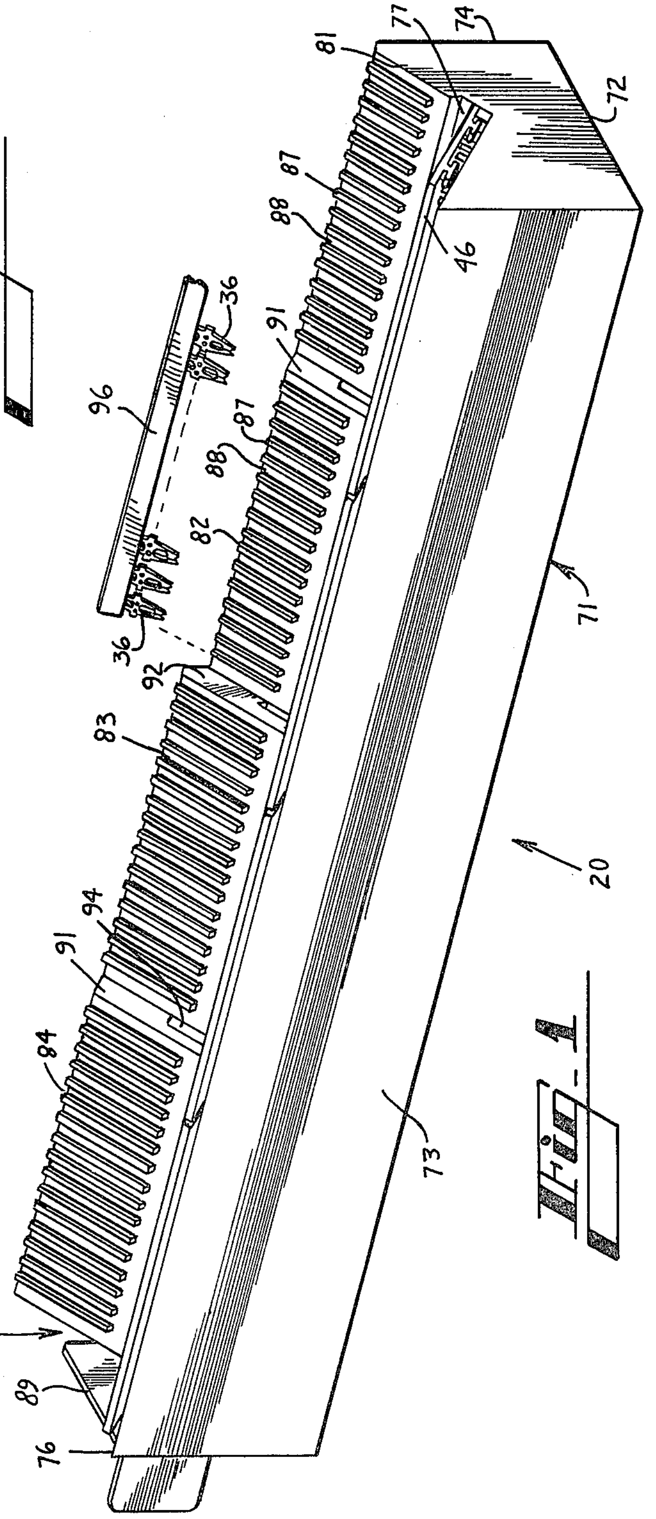
FIG. 1 is a perspective view of an apparatus of this invention for inserting a plurality of contact elements in a plurality of rows of openings in a plastic block.
Figure 2:
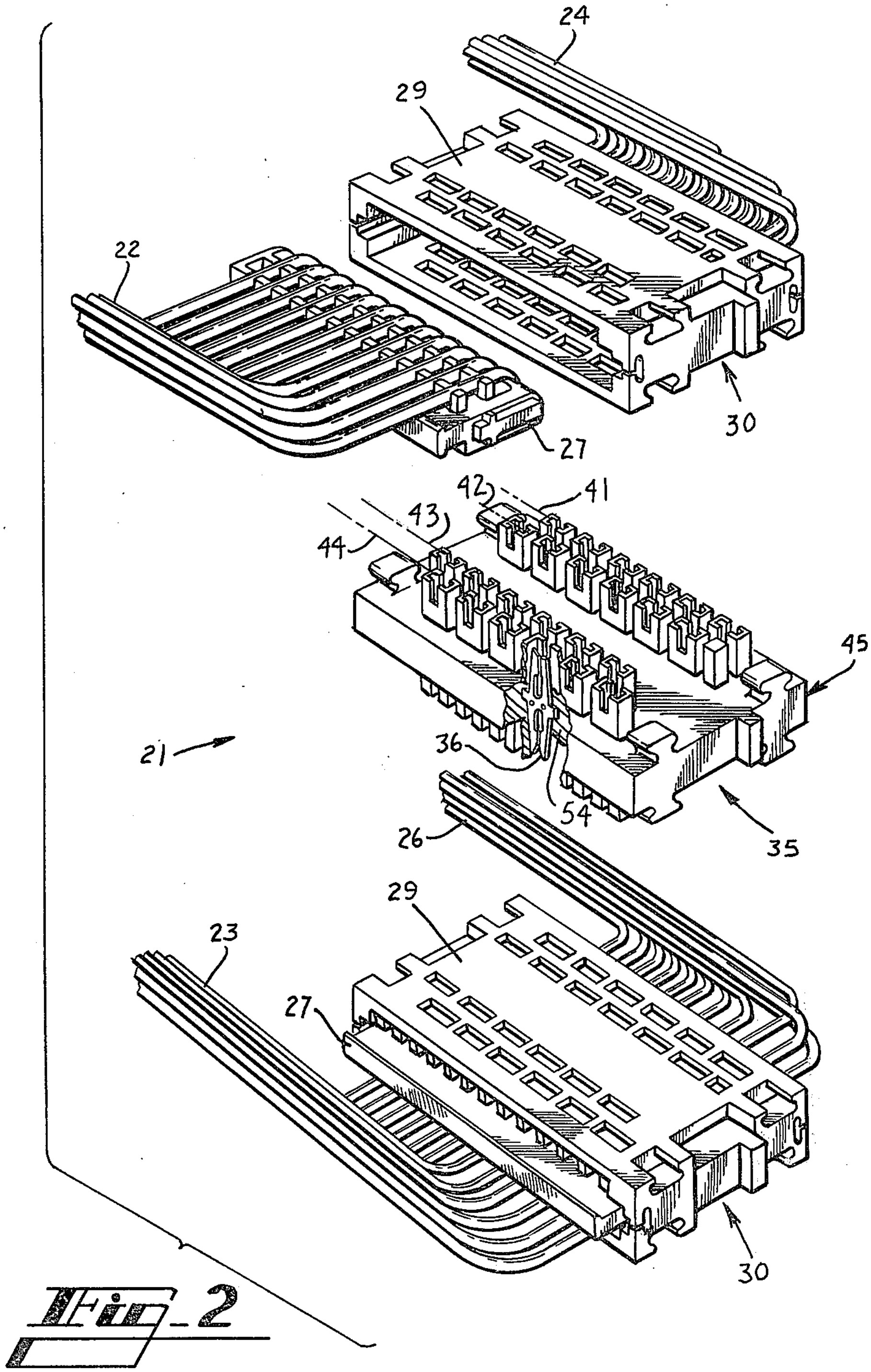
FIG. 2 is a perspective view of connectors a portion of which is assembled by the methods and the apparatus of this invention.

Referring now to FIG. 1, there is shown an apparatus of this invention designated generally by the numeral 20, said apparatus being capable of being used to assemble a portion of a connector 21 that is shown in FIG. 2. A first group of conductors 22—22 is to be connected to a corresponding group of conductors 23—23 and conductors 24—24 to a corresponding group 26—26. Each of the conductor groups 22-26 is dressed on a separate mandrel 27 and two mandrels are installed in a mandrel holder 29. When so installed, the two mandrels and their common mandrel holder 29 comprise a receptacle 30.

Two such receptacles are connected by a contact module designated generally by the numeral 35 which houses a plurality of slotted beam, insulation piercing metallic contact elements 36—36. The contact elements 36—36, each of which is about 1.12 cm in length and about 0.43 cm in width, are arranged in staggered rows 41-44 in a plastic housing 45. The mandrels 27—27 snap mount into a holder 29 and the two receptacles are pressed into engagement with the contact module 35. Piggybacking as well as other variations are readily achieved and are disclosed in hereinbefore identified U.S. Pat. No. 4,099,822, which is incorporated by reference hereinto.

Figure 3:
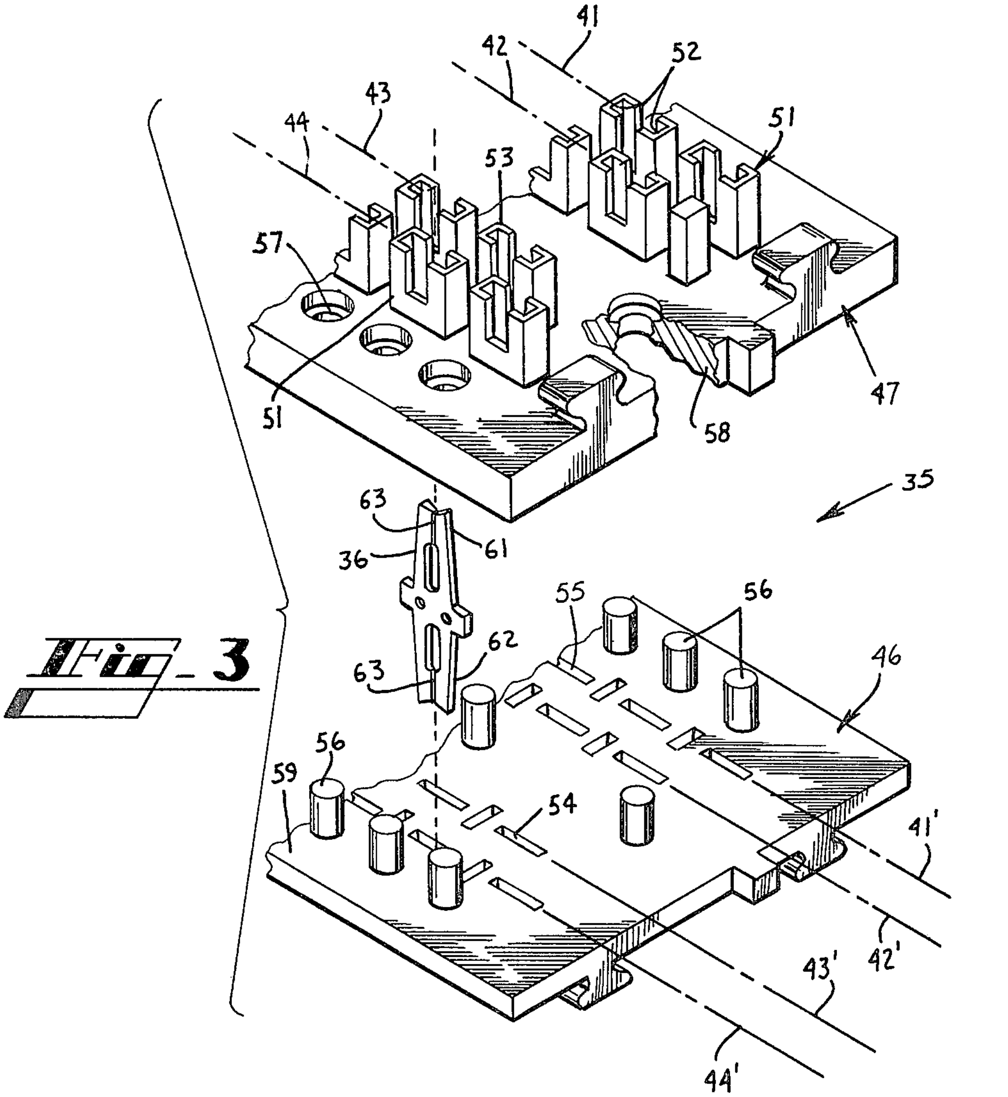
FIG. 3 is an exploded perspective view of a connector module which is assembled by the methods and the apparatus of this invention.

Turning now to FIG. 3, there is shown an exploded perspective view of a contact module 35. The housing 45 of the module 35 typically comprises two block-like portions 46 and 47 which are separately fabricated and assembled together with the contact elements 36—36 to form the contact module. An exterior of a top portion 47 is shown in FIG. 3 while an internal side of bottom portion 46 is shown in the same figure. Except for its somewhat greater thickness and pin-receiving holes, the portion 46 is basically the same as the portion 47.

Along the exterior surface of the top portion 47 are located four rows 41-44 of contact element towers 51—51. Each tower 51 includes a pair of facing risers 52—52 with a space therebetween. The interior walls of the risers 52—52 cooperate to form one portion of a slot 53. As seen in FIG. 3A, the portions of slots 53—53 of the top portion 47 are carried vertically down through the contact towers 51—51. Each slot 53 is stepped to define two ledges 54—54 and beginning at the ledges, each slot widens and is carried through to openings 55—55 in a surface 58 which will become the interior surface of the top portion 47 when the module 35 is assembled.

After a contact element 36 has been moved into each slotted opening 55 of a surface 59 which will become the interior surface of the bottom portion 46 and is received in the tower on the opposite side of the portion 46, the two portions are assembled by the insertion of staking pins 56—56 into respective ones of staking holes 57—57. With the planar surfaces 58 and 59 of the two portions in engagement with each other, the pins 56—56 protrude beyond the top surface of the portion 47, and are peened or heat-staked to secure together the portions.

When so assembled, each tower 51 of the row 41 of the portion 46 is in juxtaposition with the corresponding contact element tower 51 of the row 41 of the portion 47 as shown in FIG. 3. The slots 53—53 in the interior surfaces of the facing risers 52—52 of the bottom portion 46 are the same in width as the slots 53—53 of the top portion 47. When the two portions are assembled together, the slots which open to the planar mating surfaces 58 and 59 are in alignment with the slots of the towers.

As can be seen in FIG. 3, the towers 51—51 of the row 41 are staggered in relation to the towers of the row 42 such that a plane equidistant between two facing risers 52—52 of a given tower 51 of row 42 would be equidistant between the adjacent non-facing risers 52—52 of the two closest towers 51—51 of the row 41. A similar staggering exists between the towers 51—51 of the rows 43 and 44. The towers 51—51 of the two interior rows 42 and 43 are in alignment with each other, as are the towers 51—51 of the two exterior rows 41 and 44.

The contact elements 36—36 which are assembled with the portions 46-47 are double-ended to provide slotted beam ends 61 and 62. Each slotted beam 61 and 62 has gripping knife edges 63—63 which engage and pierce the insulation of a conductor and establish electrical engagement with the metallic portion of the conductor.

Turning again to FIGS. 1 and 4, the apparatus 20 for assembling the contact elements 36—36 to a portion of the contact module prior to the assembly of the other plastic portion thereto includes an elongated fixture 71 having a base 72 and sides 73 and 74. As can best be seen in FIG. 1, a top portion of the fixture 71 is formed with a generally V-shaped trough 75 to have a surface 76 which slopes downwardly and inwardly and is normal to another surface 77. The surface 76 is used to provide continuous support for an outer side or portions of an outer side of a portion 46 of the contact module 35 as it is moved along the fixture in a series of assembly positions therealong. The surface 77 provides supportive engagement for an edge surface of the portion 46 as it is moved along the fixture into and through each of the assembly positions. It should be noted that the portion 46 is in continuous engagement with the surfaces 76 and 77 as it is moved along the assembly fixture.

Figure 4:
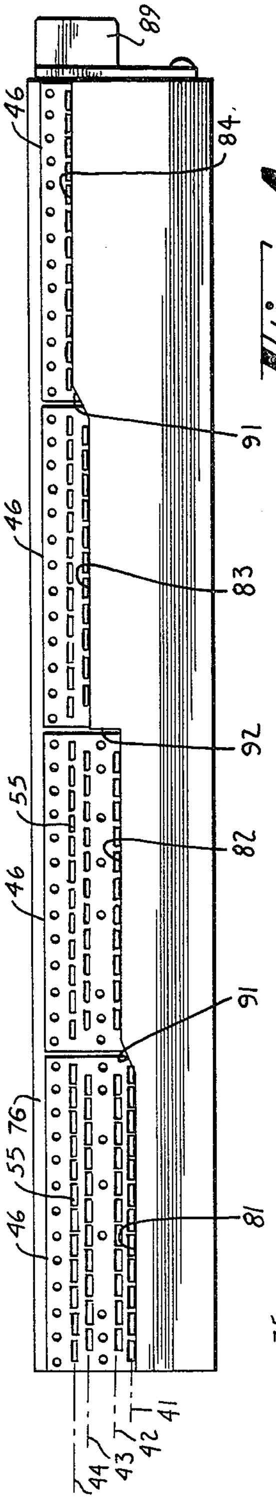
FIG. 4 is an oblique plan view of the apparatus of FIG. 1.
Figure 5:
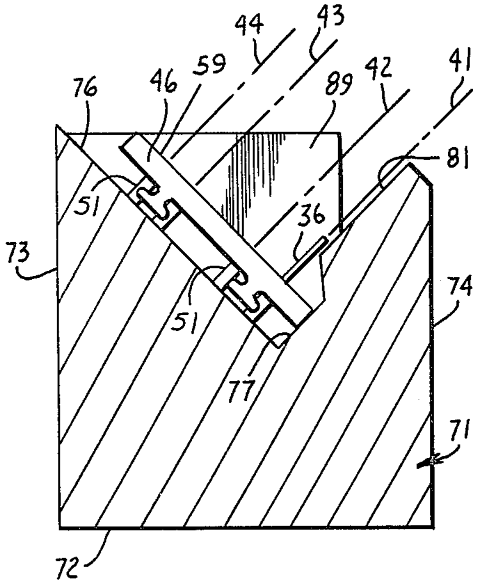
FIG. 5 is an end view partially in section and showing a housing portion of the contact module in an initial contact element insertion position with a plurality of contact elements being inserted into slots in an outside row of the portion.
Figure 6:
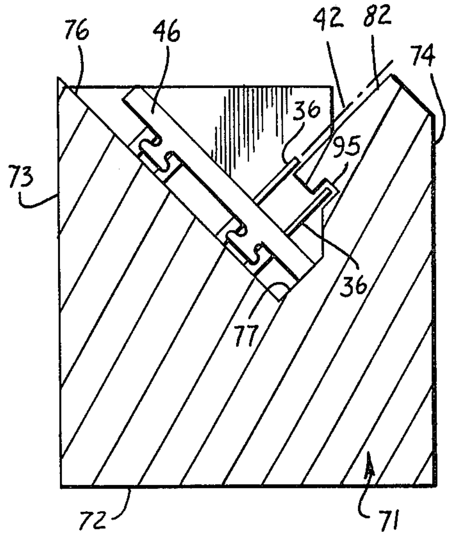
FIG. 6 is an end view partially in section and showing a portion of the contact module in a second insertion position with a plurality of contact elements which were inserted in the initial position being received in a passageway and another plurality of contact elements being inserted into slots in a second row of the contact module portion.
Figure 7:
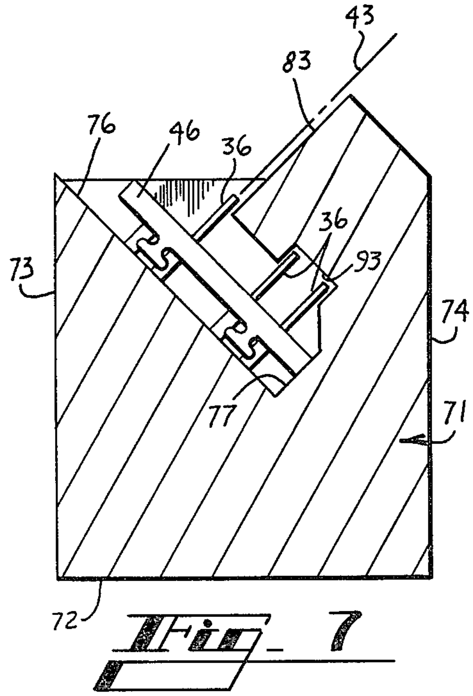
FIG. 7 is an end view partially in section and showing a portion of the contact module in a third insertion position with a plurality of contact elements occupying the first and second rows and being accommodated in a common passageway of an undercut of a surface along which contact elements are supported prior to their being inserted into a third row of the module portion.
Figure 8:
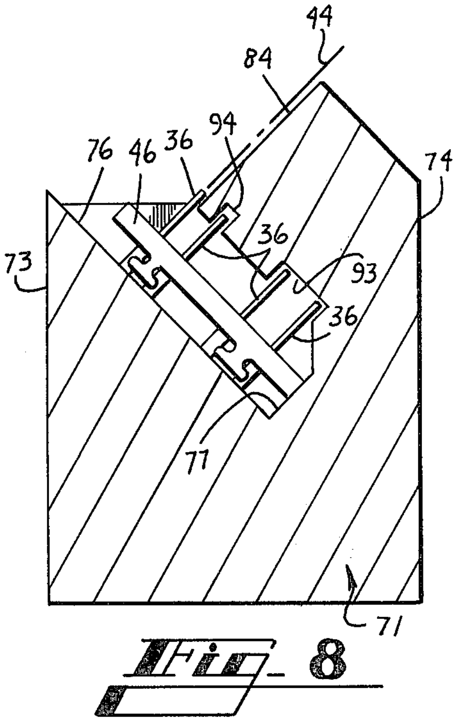
FIG. 8 is an end view partially in section and showing a portion of the contact module in a fourth and final insertion position with a plurality of contact element occupying the first, second and third rows and being accommodated in a common passageway for the first and second rows and a separate passageway for the third row with a plurality of contact elements being supported on a surface and inserted into a fourth row of slots in the contact module portion.

The fixture 71 is also formed with a contact element supporting side 81 which comprises a plurality of subsurfaces 81, 82, 83 and 84 (see FIGS. 1 and 4). These last-mentioned subsurfaces extend inwardly and downwardly from the side surface 74 toward the surface 76. Moreover, each of the subsurfaces 81–84 has a plurality of spaced ridges 87—87 formed therealong and extending toward the surface 76. The ridges 87—87 effectively form a plurality of shallow channels 88—88 therebetween each of which is designed to accommodate a contact element 36 to direct the contact element inwardly toward an aligned slotted opening of the portion 46 supported in engagement with the surface 76 (see FIG. 5).

The stepping of the surfaces 81–84 greatly facilitates the assembly of the contact elements 36—36 with the four rows of slotted openings in the portion 46. Each successive surface along the length of the fixture 81 going from right to left as viewed in FIG. 1 is spaced a greater distance outwardly of the surface 77, and because the edge surface of the module 35 is in continuous engagement with the surface 77, each successive surface is aligned with a different one of the rows 41–44 of openings in the portion 46 (see FIGS. 5–8). In other words, when the portion 46 has been moved into alignment with the first step 81, the surface is aligned with the openings in the first row 41. When the portion 46 has been moved to its second position in the fixture 71, the surface 82 is aligned with or in the same plane with the openings in the second row 42.

It should be observed from FIG. 1 that the stepped surfaces 81–84 which support the contact elements 36—36 is formed with a beveled step 91 between the first and second surfaces and between the third and the fourth surfaces. However, the increment between the second and the third surfaces is formed with an abrupt step 92. This corresponds to the equal spacing between each of the outer two rows of slotted openings in the plastic module block and to the significantly greater spacing between these two rows adjacent the longitudinal centerline of the block.

It should be apparent that, without more, problems would be encountered in indexing the portion 46 with contact elements 36—36 upstanding therefrom to the next position. In order to make room for rows of inserted contact elements 36—36 at successive load positions along the fixture 71, the subsurfaces 82–84 are undercut (see FIGS. 6–8). The arrangement of the undercuts must be made in a manner to account for the equal spacing between each of the outer two rows 41–42 and 43–44 of slotted openings in the contact module portion 46 and the greater spacing between the two centermost rows 42–43 thereof. For the same reason, an undercut 95 behind the second stepped surface 82, which accommodates the contact elements 36—36 in the first row 41, opens to a common passageway 93 behind the third stepped surface 83 (see FIG. 7) to accommodate contact elements in the first and second rows 41 and 42 whereas the portion of the fixture 71 which underlies the fourth step 84 is formed with a slot 94 which is separate and apart from the common passageway 93 to accommodate the contact elements in the third row 43 of the contact module.

The fixture 71 must be constructed to provide for the staggered spacing of the slotted openings as between adjacent rows thereof in the plastic contact module 35. Remembering that during the use of the fixture, four of the modules occupy simultaneously the channel 75 through the fixture, it is seen that it is necessary to align the channels 88—88 between the ridges 87—87 with the slotted openings in the modules. In order to do this as between successive modules, the spacing between the last channel 88 of the first step 81 and the first channel of the second step 82 is substantially greater than that between the last channel of the second step 82 and the first channel of the third step 83. The distance between the last channel of the third step 83 and the first channel of the fourth step 84 is the same as the distance between the last channel of the first step 81 and the first channel of the second step 82.

The alignment of the channels 88—88 of the fixture with the slotted openings 55—55 of the portion 46 into which the contact elements 36—36 are to be inserted is assured by a stop 89 which is pivotally mounted at the exit end of the fixture. When the stop 89 is in an operative position as shown in FIG. 4 and spanning across the trough 75, the leading one of the portions 46—46 in the fixture is in engagement with the stop. The stop 89 is mounted pivotally to the fixture so that when the leading portion 46 is in engagement with it, the slots 55—55 of each of the rows 41–44 of the portion 46 are aligned with the channels 88—88 of the surface 84. Since the portions 46—46 in the fixture are in abutting end-to-end relation, the slots of those in the first, second and third loading or insertion positions are aligned with the channels of the surfaces 81–83, respectively.

In use of the fixture, an assembly person loads dummy plastic portions 46—46 into the fixture 71 opposite the second, third and fourth steps 82–84 and a portion 46 to be loaded with contact elements 36—36 opposite the first step 81. Then an adhesively backed strip 96 having constantly spaced contact elements 36—36 adhered thereto is manipulated to position a leading group of the elements in contact element receiving channesl 88—88 between ridges 87—87 on the first step 81. The tape, which may be one such as that distributed by the Consolidated Distributing Company of New York City, N.Y. under the designation Filmic P/S Tear-Tape, has a width of about $3\frac{1}{2}$ mm. Then the strip 96 is cut and the group of elements 36—36 still being adhered to the strip is allowed to move slidably downwardly until each element is received in a slotted opening 54 in the contact module portion 46. The strip 96 is peeled from the contact elments 36—36 and discarded, the peeling becoming a process check on the integrity of the solder plating of the contact elements.

Then the stop 89 at the exit end of the fixture 71 is moved to allow removal of the leading dummy, unloaded portion 46, the remaining three blocks are shifted to the left as viewed in FIG. 1 or to the right as viewed in FIG. 4 and another module portion inserted into the first loading position. In this step of the method of loading, a sufficiently long length of strip 96 is juxtaposed with the fixture 71 to extend along the modules in the first two positions. A cut of the tape is made between the first two loading positions and adjacent the entrance end of the fixture to allow the two groups of contact elements 36—36 to be inserted into the first and second rows 41 and 42 of the slotted openings 55—55 in the module portion in the first and second positions, respectively.

The lengths of tape are removed, and the four housing portions 46—46 are shifted until the leading one, still a dummy, is removed, and another unfilled portion is moved into the first position. At this time, the contact elements 36—36 which project upwardly from the rows 41 and 42 of the portion 46 are received in the common passageway 93 behind the undercut in the stepped surface 83.

This process is repeated until all of the so-called dummy portions 46—46 have been removed. Then a length of strip 96 extending along the entire length of the fixture 71 is used in each step severed at four locations, one at each step and one at the entrance to the fixture. Thereafter the method of this invention is repeated to insert contact elements 36—36 into a row of openings of the housing portion 46 in each insertion position after which the plurality of housing portions are indexed in the trough 75 to position each housing portion in another insertion position. The housing portion 46 which is in engagement with the stop 89 occupies a position in which its last unfilled row 44 of openings is filled with the contact elements 36—36.

Subsequently, the assembly person assemblies a housing portion 47 to each of the now filled housing portions 46—46 having four rows of contact elements 36—36 therein. The assembly of the portions 46 and 47 causes an unenclosed end 62 of each of the contact elements 36—36 to be received in an opening 55 of a slot 53 of an aligned tower 51. Each of the contact elements 36—36 is stabilized by oppositely extending tabs thereof engaging the surface 58 of the portion 46 and by risers (not shown) which are formed on the surface 59 of the portion 47 being received in transverse slots 39—39 to enclose the tabs of the contact elements. This arrangement in the assembled contact module is well described in the above-identified Carlisle et al. U.S. Pat. No. 4,099,822.

While apparatus of this invention has been described as including the stop 89 at the exit end of the fixture, the invention is not so limited. For example, a plurality of stops spaced along the trough 75 could be provided such that the engagement of a block portion 46 with a selected stop causes openings of a row in the block to be aligned with an adjacent portion of the stepped surface associated with that particular insertion position.

It is to be understood that the above-described arrangements are simply illustrative of the invention. Other arrangements may be devised by those skilled in the art which will embody the principles of the invention and fall within the spirit and scope thereof.

What is claimed is:

1. An apparatus for use in the insertion of a plurality of contact elements into openings which are arranged in a plurality of parallel rows in a housing portion, said apparatus comprising:

means for holding a housing portion successively in each of a plurality of contact element insertion positions, the housing portion having a plurality of openings arranged in a plurality of parallel rows and extending between two major surfaces which are connected through peripheral edge surfaces, said holding means including means for supporting the housing portion along one of its edge surfaces and for supporting said housing portion along portions of one of its major surfaces, said supporting means being in substantially continuous engagement with the edge surface and the portions of the one major surface through the plurality of positions; and means extending through the plurality of positions and having successive portions spaced at incrementally greater distances from said means which supports the edge surface of the housing portion for supporting a plurality of spaced-apart contact elements prior to their insertion into the openings of the rows of the housing portion, each of said successive portions being associated with one of the insertion positions and aligned with one of the rows of openings in a housing portion in the associated insertion position, said supporting means for the contact elements being formed to accommodate projecting free end portions of inserted contact elements between the plurality of contact elements to be inserted at an insertion position and said means which supports the edge surface of the housing portion to permit a housing portion having at least one row of inserted contact elements to be moved into and out of the contact element insertion position.

2. The apparatus of claim 1, wherein said means for supporting the contact elements includes a stepped surface which extends from one end to another of said holding means, the stepped surface being normal to at least one of the major surfaces of the housing portion, further, each successive portion of said stepped surface being spaced at successively greater distances from said supporting means for the edge surface of the housing portion and aligned with one of the rows of openings of a housing portion in engagement with said holding means in the associated insertion position.

3. The apparatus of claim 2, wherein said means for supporting the edge surface of the housing portion comprises a first surface and said means for supporting the portions of the one major surface of the housing portion comprises a second surface, said first and second surfaces being normal to each other.

4. The apparatus of claim 2, wherein said apparatus also includes a plurality of spaced parallel ridges formed on each portion of said stepped surface with adjacent ones of said ridges being spaced apart a distance to receive a contact element therebetween such that the longitudinal axes of the contact elements are parallel to said ridges.

5. The apparatus of claim 3, wherein each successive portion of said stepped surface other than the portion which is associated with the initial contact element insertion position includes a passageway which is spaced a distance above said first surface that supports the edge surface of the housing portion for allowing passage of contact elements which have been inserted into the housing portion at a prior insertion position.

6. The apparatus of claim 4, which also includes means engaging a leading one of a plurality of housing portions which are loaded into said apparatus in end-to-end juxtaposition through the plurality of contact element insertion positions for causing the openings of a row of the housing portion in each of the insertion positions to be aligned with the contact elements which are received between the ridges of the portion of the stepped surface associated with each insertion position.

7. The device of claim 2, wherein the incremental spacing of said surfaces from said means for supporting said housing portions along their edge surfaces is nonuniform.

8. A method of inserting a plurality of contact elements into each of a plurality of rows of openings in a housing portion, each of the openings in the housing portion extending between two major surfaces of the housing portion, the housing portion having a peripheral edge surface which joins the two major surfaces, said method including the steps of:

supporting a housing portion along two surfaces which lie in intersecting planes and which are inclined to a horizontal line, one of said planes being parallel to at least one of the major surfaces of the housing portion and the other of the planes being parallel to the peripheral edge surface of the housing portion;

moving the housing portion successively into and then out of each of a plurality of contact element insertion positions while maintaining the housing portion in engagement with said two supporting surfaces;

supporting a plurality of spaced contact elements in alignment with the housing portion in each of the insertion positions with each successive plurality of contact elements being spaced a greater distance from said other plane than the preceding plurality; while causing the openings in successive ones of the rows in the housing portion to be aligned with the plurality of contact elements in successive ones of the insertion positions; and causing the contact elements which are supported at each of the insertion positions to be inserted into the openings of the aligned one of the rows of the housing portion.

9. A method of inserting a plurality of contact elements into each of a plurality of rows of openings in a plastic housing portion, each of the openings in the housing portion extending between two parallel major surfaces of the housing portion, the housing portion having a peripheral edge surface which joins the two major surfaces, said method including the steps of:

supporting a plurality of the plastic housing portions in end-to-end relationship in predetermined positions along two surfaces which lie in intersecting planes and which are inclined to a horizontal line, one of said planes being parallel to the major surfaces of the housing portion and the other of the planes being parallel to the peripheral edge surface of the housing portions, each of the housing portions, in a predetermined position being in a contact element insertion position for one of the rows of openings with successive positions being used to insert contact elements into rows of openings successively farther from said other plane;

supporting a plurality of spaced contact elements adjacent the plastic housing portion in each of the insertion positions, the contact elements aligned with successive housing portions being supported at successively farther distances from said other plane and the contact elements of each plurality being aligned with the openings of the adjacent housing portion;

causing each plurality of contact elements to be inserted into the row of aligned openings of the housing portion in each of the insertion positions; and moving the housing portions to move each unfilled housing portion into a next successive insertion position after which a plurality of contact elements is caused to be inserted in the next successive empty row of openings of each housing portion.

10. The method of claim 9, wherein the other one of the planes is normal to the major surfaces of the housing portion.

11. The method of claim 9, wherein each plurality of the contact elements is supported on a portion of a stepped surface, each successive portion of the stepped surface being a greater distance from the other plane which supports the peripheral edge surface of the housing portion than the distance from the plane to the row of openings which were loaded in the prior step.

* * * * *